United States Patent
Shank et al.

(10) Patent No.: US 6,301,703 B1
(45) Date of Patent: Oct. 9, 2001

(54) METHOD FOR TRANSFORMING STATE-BASED IVR APPLICATIONS INTO EXECUTABLE SEQUENCES OF CODE

(75) Inventors: Charles Kevin Shank, Austin, TX (US); R. Alberto Villarica, Fairport, NY (US)

(73) Assignee: Nortel Networks Limited (CA)

( * ) Notice: Subject to any disclaimer, the term of this patent is extended or adjusted under 35 U.S.C. 154(b) by 0 days.

(21) Appl. No.: 09/223,721

(22) Filed: Dec. 31, 1998

(51) Int. Cl.[7] .................................................. G06F 9/445
(52) U.S. Cl. ................................................................ 717/5
(58) Field of Search ..................................................... 717/5

(56) References Cited

U.S. PATENT DOCUMENTS

| | | |
|---|---|---|
| 4,989,132 * | 1/1991 | Mellender et al. .................. 364/200 |
| 5,255,305 | 10/1993 | Sattar . |
| 5,386,464 | 1/1995 | Pruitt . |
| 5,452,341 | 9/1995 | Sattar . |
| 5,539,661 | 7/1996 | Nordenstam . |
| 5,594,904 | 1/1997 | Linnermark . |
| 5,920,718 * | 7/1999 | Uczekaj et al. ...................... 395/702 |
| 5,950,172 * | 9/1999 | Klingman ............................... 705/26 |
| 6,052,455 * | 4/2000 | James .................................. 379/201 |
| 6,122,356 * | 9/2000 | James .................................. 379/201 |

* cited by examiner

Primary Examiner—Mark R. Powell
Assistant Examiner—Michael B. Holmes
(74) Attorney, Agent, or Firm—Finnegan, Henderson, Farabow, Garrett & Dunner, L.L.P.

(57) ABSTRACT

Methods and apparatus transform a state-based application into an executable program. A script representing a state-table application is exported from a development environment for a state-based system. The script is translated into a specifically structured, compilable code sequence. e.g., in the Java or C++ programming language. The code is compiled with a library, allowing the executable program to interface with a hardware platform. In order for the executable program to interface with a different hardware platform, only the library needs to be modified.

10 Claims, 2 Drawing Sheets

METHOD FOR TRANSFORMING STATE-BASED IVR APPLICATIONS INTO EXECUTABLE SEQUENCES OF CODE

BACKGROUND OF THE INVENTION

The present invention relates to a method and system for transforming a state-based application into an executable code sequence and, more particularly, to a method and system for transforming a state-table exported from a state-based development environment into an executable code sequence.

The area of media and telephony applications, also referred to as computer telephony, has expanded to meet the growing demand for advanced telephony applications in telecommunications networks. The area of computer telephony includes a number of application-specific devices, many of which have proprietary implementations. One such device is an interactive voice response (IVR) system, which enables the development of interactive voice applications, such as voice mail.

As the number of media and telephony applications has grown, media servers have emerged to interface with multiple application-specific devices and provide a development environment in which developers can create applications that access various devices such as IVR systems, facsimile servers, and e-mail gateways. Through the use of a media server, various computer telephony applications can share media resources.

Many IVR systems (e.g., IBM's DirectTalk/6000 IVR system) operate in a state-driven environment in which an application is defined by a sequence of states, where each state represents an action, and the result of the action determines the next state the application will process. Most state-based IVR systems have a service creation tool that allows a developer to define a service or application by graphically or textually creating a sequence of states. For example, a developer may create applications for IBM's DirectTalk/6000 IVR system using a state-table editor (textual) or an iconic editor (graphical). The output of such a service creation tool is a sequence of states (state-table) in an interpretable form. Thus, a state-based application created by one of these service creation tools is usually passed through an interpreter when executed.

The disadvantages of a state-based IVR application that must be interpreted are twofold. First, execution of an application in state-table form is less efficient than execution of a machine executable application because the state-table must be passed through an interpreter before execution. Interpretation of a state-table is slower than binary execution of the same state-table. Second, the state-table form of an application may not be executable by a media server since it may not be compatible with its runtime environment, e.g., where the service creation tool of one media server is used to produce an application to be run on a different media server.

SUMMARY OF THE INVENTION

A process consistent with the present invention transforms an application for a state-driven system into an executable code sequence comprising by receiving a script representing a state-table of the application, the script including a state and a corresponding action; translating the script into a compilable code sequence by creating a class representing the state-table and creating a method for the class including a switch statement having a case corresponding to the state for executing the corresponding action; and compiling the compilable code sequence into an executable code sequence.

Additional features and advantages of the present invention will be readily appreciated by one of ordinary skill in the art from the following detailed description of the best mode for carrying out the invention when taken in connection with the accompanying drawings.

DETAILED DESCRIPTION OF THE PREFERRED EMBODIMENTS

Figure 1:
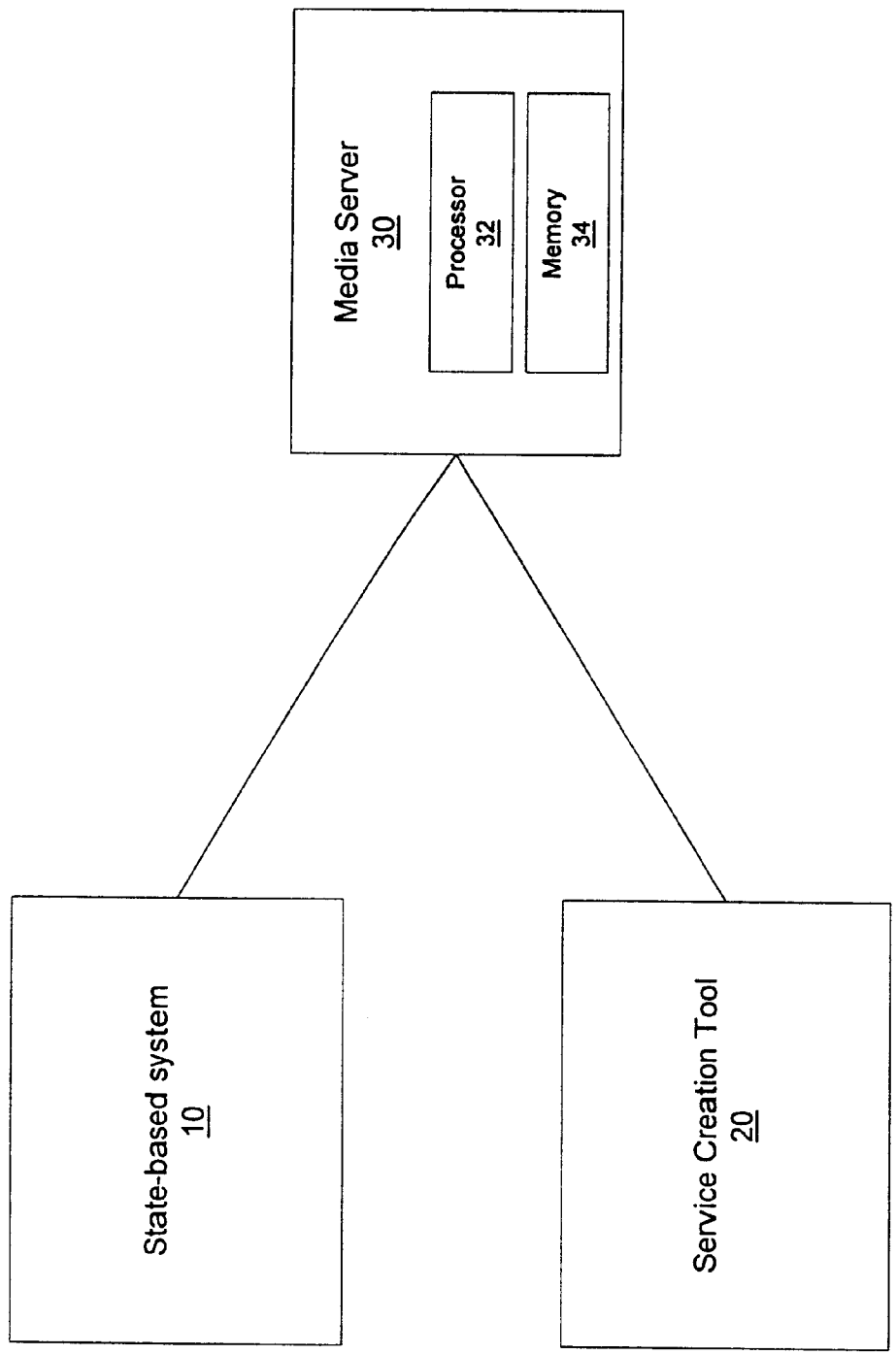
FIG. 1 is a high-level block diagram of a state-based system and a media server in which a method consistent with the present invention may operate.

FIG. 1 illustrates a high-level block diagram of a state-based system and a media server in which a method consistent with the present invention may operate. State-based system 10 is a system, such as an IVR system, that operates in a state-driven environment An application running on state-based system 10 is defined by a sequence of states, where each state represents an action, and the result of the action determines the next state the application will process. Developers create applications for execution on state-based system 10 using service creation tool 20, which allows developers to edit the sequence of states, or state-table, for an application. Service creation tool 20 may be, for example, a state-table editor, which allows the state-table to be edited textually, or an iconic editor, which allows the states to be edited graphically. For example, the development environment for IBM's DirectTalk/6000 IVR system has both a state-table editor and an iconic editor available.

Media server 30 receives a state-table exported from service creation tool 20 and, in methods consistent with the present invention, translates it into a compilable code sequence in Java or C++, for example. Although service creation tool 20 is shown to be separate from media server 30 in FIG. 1, service creation tool 20 may be incorporated into media server 30. Media server 30 includes processor 32 and memory 34. Processor 32 may be provided by conventional microprocessor circuits. Memory 34 may include both RAM and ROM portions and may be implemented with any type of computer-readable medium, such as any electronic, magnetic, or optical read/write storage device. Memory 34 stores data that serves as instructions to processor 32, and which, when executed by processor 32, causes media server 30 to carry out methods consistent with the present invention. Memory 34 may also include a library (not shown) that interfaces with the hardware platform (not shown) of media server 30. The hardware platform includes an IVR system and other components used to perform the actions associated with a state in the state-table. Consistent with the present invention, media server 30 compiles a compilable code sequence (translated from a state-table) with the library in memory 34 so that executable code sequences may interface with the hardware platform.

TABLE 1

```

#====================
# Description
DESCRIPTION("ansr1");

#====================
```

TABLE 1-continued

```
# Prompt Directory
PROMPT_DIRECTORY(ansr1);

#=====================
# Entry Point(s)
ENTRY_POINT(start,start);

#=====================
# Actions
start: "answer the incoming call"
    AnswerCall( )
        edge EDGE_AC_NOT_RINGING: end
    ;
announce: "say something"
    PlayPrompt(FALSE, Welcome)
        edge EDGE_HUP: end
    ;
    "say something again"
    PlayPrompt(FALSE, Welcome)
        edge EDGE_PP_COMPLETED: end
        edge EDGE_HUP: end
    ;
end: "end"
    CloseEverything( )
    ;
```

In the example in Table 1, there are three states: "start," "announce," and "end." In the "start" state, the action is AnswerCall. If the telephone is not ringing, then edge EDGE_AC_NOT_RINGING is taken, which would lead an interpreter to execute the "end" state. If the telephone is ringing, the call is answered, and the application enters the "announce" state. In the "announce" state, the action PlayPrompt is executed. If the caller hangs up while the prompt is being played, the system returns EDGE_HUP, which would cause an interpreter to jump to the "end" state. If the prompt is played in its entirety, an unnamed state is entered. In this unnamed state, the action PlayPrompt is executed. If the caller hangs up while the prompt is being played, the system returns EDGE_HUP, which would cause an interpreter to jump to the "end" state. If the prompt is played in its entirety, the edge EDGE_PP_COMPLETED is taken, which would also lead an interpreter to jump to the "end" state. In summary, the example application in Table 1 answers the telephone if it is ringing, plays two identical prompts to the caller, then hangs up. If the caller hangs up while the system is playing prompts, the application ends the call.

Figure 2:
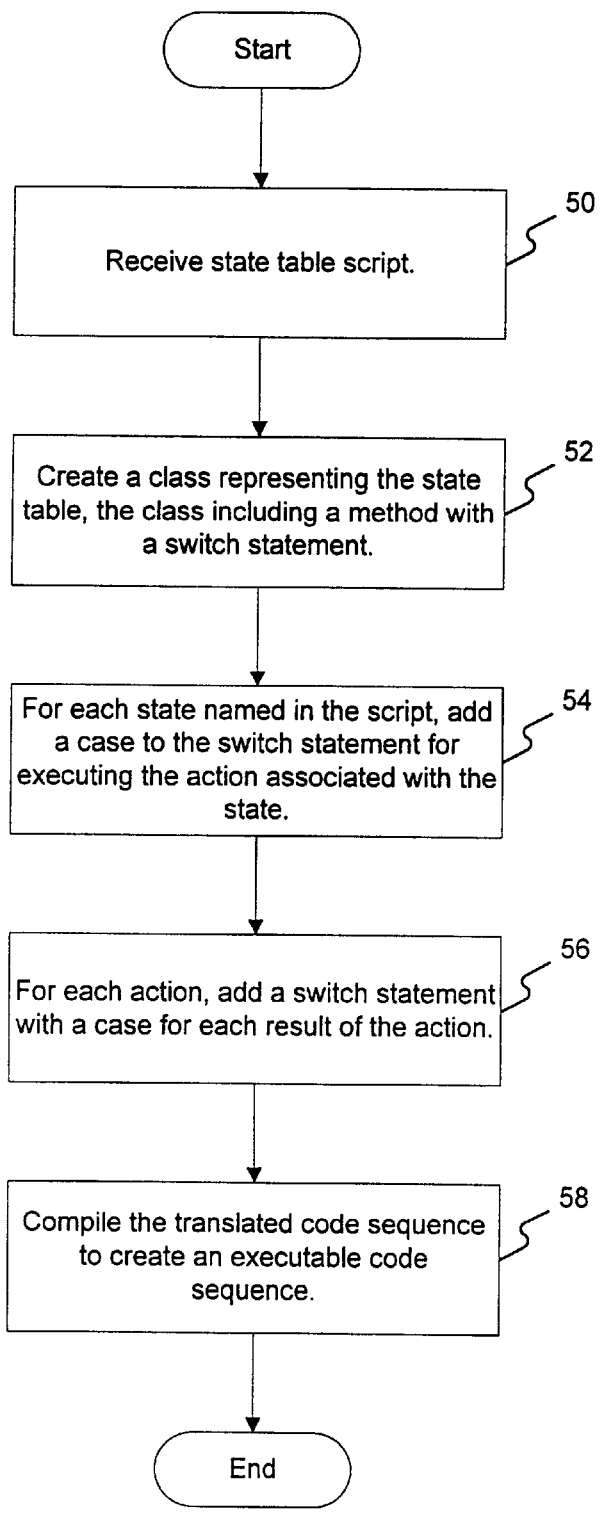
FIG. 2 illustrates a flowchart of a method for transforming a state-based application to an executable code sequence consistent with the present invention.

FIG. 2 is a flowchart illustrating a method consistent with the present invention for transforming a state-based application into an executable code sequence. After receiving a script representing an application, such as the script shown in Table 1, from service creation tool 20 (step 50), media server 30 translates the script into a specifically structured C++ or Java program by creating a class representing the state-table (step 52). Any variables used by the state-table become instance variables in the class. Table 2 shows a class created in the C++ programming language for the state-table script shown in Table 1.

TABLE 2

```
class ansr1 st: public DTState {
private:
    class DTLabels {
    public:
        enum Labels {
            Dtstart,
            Dtannounce,
            DTend
        };
```

TABLE 2-continued

```
    };
    // constants
public:
    ansr1st( ) {
    }
    ~ansr1st( ) {
    }
    int execute(DTAction& dtAction, DTVariableArray& inParameters) {
        // local variables
        // prompt directory
        DTString promptDirectory("ansr1");
        DTVariableArray params;
        int caseActionParams[16];
        DTString Dtvar_undefined;
        int nextState = DTLabels::DTstart;
        boolean done = false;
        int return Value = 0;
        while (!done) {
            switch (nextState) {
                ...
            }
            nextState:
        }
    }
```

The class in Table 2 is created to include a method called "execute," which includes a switch statement.

For each state named in the script, a method consistent with the present invention adds a case to the switch statement (step 54). For each state, the switch statement executes the action associated with the state. The result of each action is also put into a switch statement so that the result of the action can affect the nextState variable of the first switch statement (step 56). For example, Table 3 shows details of the switch statement corresponding to the "start" state from the state-table in Table 1. For the Answercall action corresponding to the "start" state, there is a switch statement with two cases. First, for the edge EDGE_AC_NOT_RINGING, the phone is not ringing, and the nextState variable is set to the "end" state. Second, for the edge EDGE_DONE, the phone is ringing, and the nextState variable is set to the next state (ie., "announce"). Thus, by using a switch statement for the result of the action, a method consistent with the present invention identifies the next state to be executed.

TABLE 3

```
int execute(DTAction& dtAction, DTVariableArray& inparameters) {
    ...
    while (!done) {
        switch (nextState) {
            default:
            case DTLabels::DTstart:
                // answer the incoming call
                switch (dtAction.answercall( )) {
                    case DTEdges::EDGE_AC_NOT_RINGING.
                    nextState DTLabels::DTend;
                    goto nextState;
                    case DTEdges::EDGE DONE:
                    done = true;
                    goto nextState;
                    default:
                    break;
                }
            ...
        }
        nextState:
    }
}
```

If a state is not named in the script, its action can be appended to the named state above it. This allows state-tables with both named and unnamed states to be transformed like state-tables with only named states, but such that unnamed states cannot be targets of any jumps. For example, in Table 1, the state "announce" is actually composed of two states, where one is named and the other is not. In this example, the unnamed state is entered upon successful execution of the previous named state, i e., "announce." The unnamed state cannot be the target of a jump because there is no way to reference it.

Once the script has been translated into a compilable code sequence (steps 52–56), media server 30 compiles the compilable code sequence to create a binary executable code sequence (step 58). Consistent with the present invention, the translated script may be compiled with a library, which is stored in memory 34 and interfaces with the hardware platform. Only the library needs to be changed for the compilable code sequence to be used on different media servers. Thus, the result of a method consistent with the present invention, as exemplified by the steps in FIG. 2, is an executable code sequence for running an application developed for a state-based system. The executable code can be run by media server 30, rather than only in the runtime environment of state-based system 10. The code also results in more efficient execution because it does not have to be passed through an interpreter at runtime.

It will be appreciated by those skilled in this art that various modifications and variations can be made to the transformation methods described herein without departing from the spirit and scope of the invention. Other embodiments of the invention will be apparent to those skilled in this art from consideration of the specification and practice of the invention disclosed herein. It is intended that the specification and examples be considered exemplary only, with a true scope and spirit of the invention being indicated by the following claims.

We claim:

1. A process for transforming an application for a state-driven telephony system into an executable code sequence comprising:
   receiving a script at a media server, the script representing a state-table of the application for the state-driven telephony system, the script including at least one state and at least one corresponding action, wherein each state corresponds to a mode of the telephony system and each action corresponds to a process of the state-driven telephony system;
   translating the script into a compilable code sequence, including
      creating a class representing the state-table, and
      creating a method for the class including a switch statement having a case corresponding to the state for executing the corresponding action; and
   compiling the compilable code sequence into an executable code sequence that may be executed on the media server to control the telephony system.

2. The process of claim 1 wherein the system includes an iconic editor for developing state-based applications and receiving includes receiving a script representing a state-table from the iconic editor.

3. The process of claim 1 wherein the system includes a text-based state-table editor for developing state-based applications and receiving includes receiving the script representing a state-table from the state-table editor.

4. The process of claim 1 wherein compiling includes compiling the compilable code sequence with a library that interfaces to a hardware platform.

5. The process of claim 1 wherein the action corresponding to the state has a corresponding result, and wherein translating further includes
   adding to the method a switch statement associated with the action for determining a next state and having a case corresponding to the result that corresponds to the action.

6. A media server comprising:
   means for receiving a script at a media server, the script representing a state-table of an application for a state-driven telephony system, the script including at least one state and at least one corresponding action, wherein each state corresponds to a mode of the telephony system and each action corresponds to a process of the telephony system;
   means for translating the script into a compilable code sequence, including
      means for creating a class representing the state-table, and
      means for creating a method for the class including a switch statement having a case corresponding to the state for executing the corresponding action; and
   means for compiling the compilable code sequence into an executable code sequence that may be executed on the media server to control the state-driven telephony system.

7. The media server of claim 6 wherein the system includes an iconic editor for developing state-based applications and the receiving means includes means for receiving a script representing a state-table from the iconic editor.

8. The media server of claim 6 wherein the system includes a text-based editor for developing state-based applications and the receiving means includes means for receiving a script representing a state-table from the text-based editor.

9. The media server of claim 6 wherein the compiling means includes means for compiling the compilable code sequence with a library that interfaces to a hardware platform.

10. The media server of claim 6 wherein the action corresponding to the state has a corresponding result, and wherein the translating means further comprises
   means for adding to the method a switch statement associated with the action for determining a next state and having a case corresponding to the result that corresponds to the action.

* * * * *